(12) United States Patent
Liu

(10) Patent No.: US 6,740,996 B1
(45) Date of Patent: May 25, 2004

(54) MOTOR DRIVE WITH A COMBINATION STEP CONTROL

(76) Inventor: Curtis Liu, 105, Chung Hsing Road, Lu Chu, Taoyuan Hsien (TW)

( * ) Notice: Subject to any disclaimer, the term of this patent is extended or adjusted under 35 U.S.C. 154(b) by 88 days.

(21) Appl. No.: 10/395,076

(22) Filed: Mar. 25, 2003

(51) Int. Cl.$^7$ ................................................ H02K 7/10
(52) U.S. Cl. ................ 310/75 R; 310/68 B; 310/68 E; 310/78
(58) Field of Search ............................ 310/75 R, 68 R, 310/68 B, 68 E, 78, 80, 83

(56) References Cited

U.S. PATENT DOCUMENTS

| | | | | |
|---|---|---|---|---|
| 3,927,436 A | * | 12/1975 | Inoue et al. ............. | 15/250.17 |
| 4,055,023 A | * | 10/1977 | Gatland et al. ................. | 49/28 |
| 4,715,462 A | * | 12/1987 | Taig ............................. | 180/444 |
| 4,980,591 A | * | 12/1990 | Takanashi et al. ............. | 310/83 |
| 5,061,886 A | * | 10/1991 | Yamada ........................ | 318/565 |
| 5,875,681 A | * | 3/1999 | Gerrand et al. ................ | 74/427 |
| 6,229,233 B1 | * | 5/2001 | Torii et al. ................. | 310/75 R |

* cited by examiner

Primary Examiner—Burton Mullins
(74) Attorney, Agent, or Firm—Troxell Law Office PLLC

(57) ABSTRACT

A motor drive is constructed to include a DC motor, the DC motor having a worm at the output shaft thereof, a speed reducing mechanism formed of a main shaft and worm gear meshed with the worm and axially slidably mounted on the main shaft, a clutch adapted to control engagement between the main shaft and the worm gear, a mechanical step counter adapted to control forward/backward rotation of said DC motor, and an electronic step counter adapted to detect the pulse of the DC motor and to calculate the time to control forward/backward rotation of the DC motor.

8 Claims, 7 Drawing Sheets

MOTOR DRIVE WITH A COMBINATION STEP CONTROL

BACKGROUND OF THE INVENTION

1. Field of the Invention

The present invention relates to a DC motor drive and, more particularly, to a DC motor drive with a combination step control practical for use in an electric steel rolling door or the like.

2. Description of the Related Art

FIG. 1 shows a motor drive for use in an electric steel rolling door according to the prior art. As illustrated, the motor drive comprises a DC motor 1', a control mechanism 2', and a clutch 3'. The DC motor 1' is adapted to roll up/let off the steel rolling door. The control mechanism 2' is comprised of a limit switch 22' and two control rods 21', and adapted to control the direction of rotation of the DC motor 1'. The clutch 3' has a handle 31' for operation by hand to disengage a clutch gear from the DC motor 1' for enabling the DC motor 1' to run idle when AC power failed. This design of motor drive is expensive to manufacture. Further, installation and maintenance works of this design of motor drive are complicated.

SUMMARY OF THE INVENTION

The present invention has been accomplished under the circumstances in view. It is the main object of the present invention to provide a motor drive, which combines a DC motor, step counting means, and clutch means into a simple compact structure. It is another object of the present invention to provide a motor drive, which is inexpensive to manufacture and easy to maintain. To achieve these and other objects of the present invention, the motor drive comprises a DC motor, the DC motor having a casing at one side and a worm fixedly mounted on an output shaft thereof and fastened pivotally with the casing; a speed reducing mechanism, the speed reducing mechanism comprising a main shaft fastened pivotally with the casing, and a worm gear mounted on the main shaft for free rotation relative to the main shaft and meshed with the worn, the worm gear having a plurality of radial engagement blocks equiangularly located on one side thereof; a clutch mounted inside the casing, the clutch comprising a clutch gear, the clutch gear axially movably mounted on the main shaft of the speed reducing mechanism, an annular flange protruded from an opposite side thereof, and a locating groove extended around the periphery of the annular flange, the clutch gear being axially movable along the main shaft relative to the worm gear between a first position where the clutch gear is forced into engagement with the radial engagement blocks of the worm gear for enabling synchronously rotation with the worm gear, and a second position where the clutch gear is disengaged from the radial engagement blocks of the worm gear for enabling idle running, a spring member adapted to force the clutch gear into engagement with the worm gear, a lever coupled to the locating groove of the clutch gear, and a locking plate coupled to the lever for operation by the user to drive the lever to move the clutch gear away from the worm gear for enabling the main shaft to run idle; a mechanical step counter adapted to control forward/ backward rotation of the DC motor, the mechanical step counter comprising a limit switch, a first reducing gear set coupled to the main shaft for synchronous rotation and adapted to drive the limit switch to control forward rotation of the DC motor, and a second reducing gear set coupled to the main shaft for synchronous rotation and adapted to drive the limit switch to control backward rotation of the DC motor, the first reducing gear set and the second reducing gear set each having a last reducing gear, the last reducing gear having a gear shaft extending out of one sidewall of the casing, and a protruding block mounted on the gear shaft of said last reducing gear and adapted to trigger a respective contact of the limit switch; and an electronic step counter, the electronic step counter comprising a control IC, a multi-magnet member mounted on one end of the worm for synchronous rotation, and an inductor fixedly mounted in the casing and facing the multi-magnet member and adapted to detect the pulse of the DC motor and output a signal to he control IC subject to the pulse of the DC motor, enabling the control IC to calculate the time to control forward/backward station of the DC motor.

DETAILED DESCRIPTION OF THE PREFERRED EMBODIMENT

Figure 1:
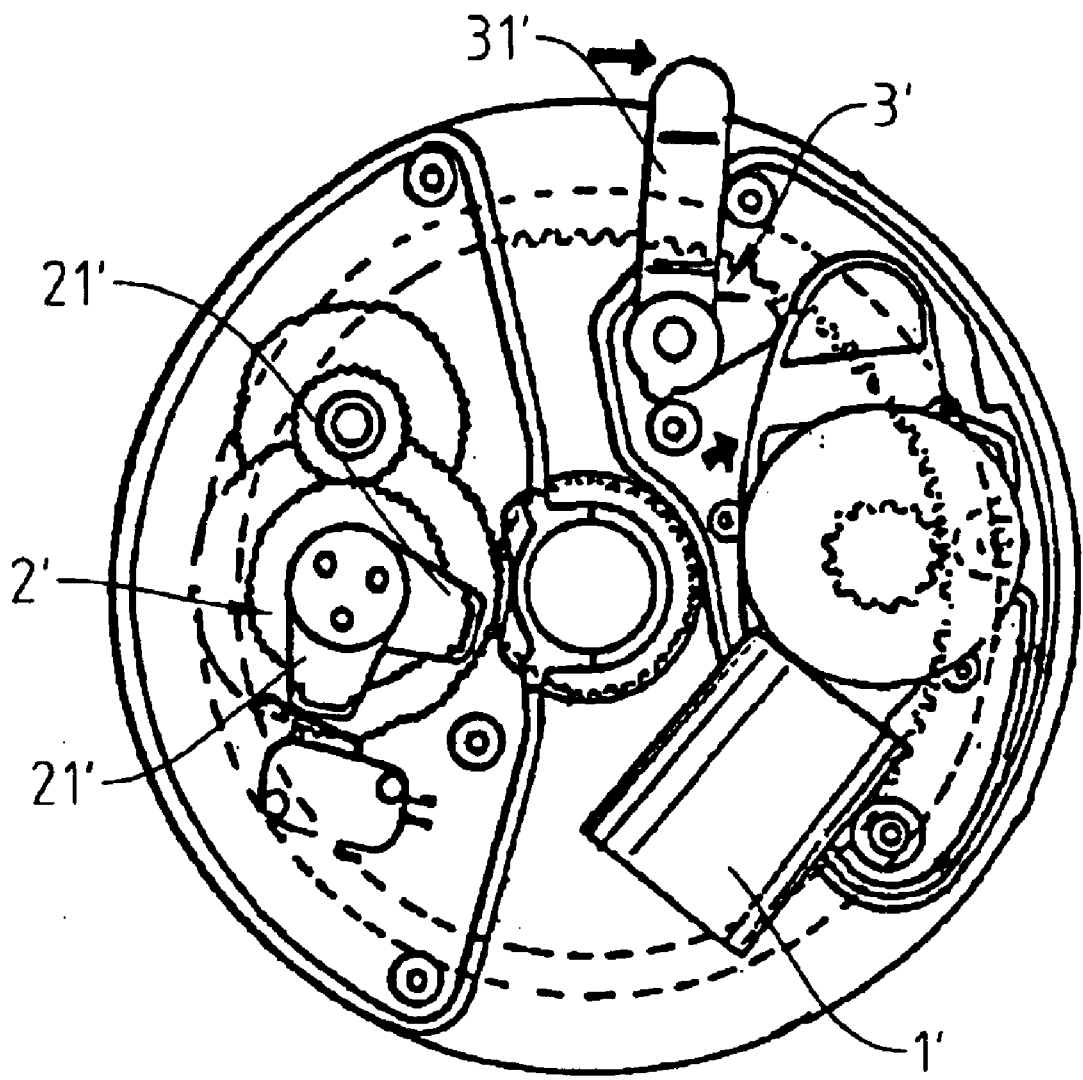
FIG. 1 is a schematic drawing showing the structure of a motor drive for an electric steel rolling door according to the prior art.
Figure 2:
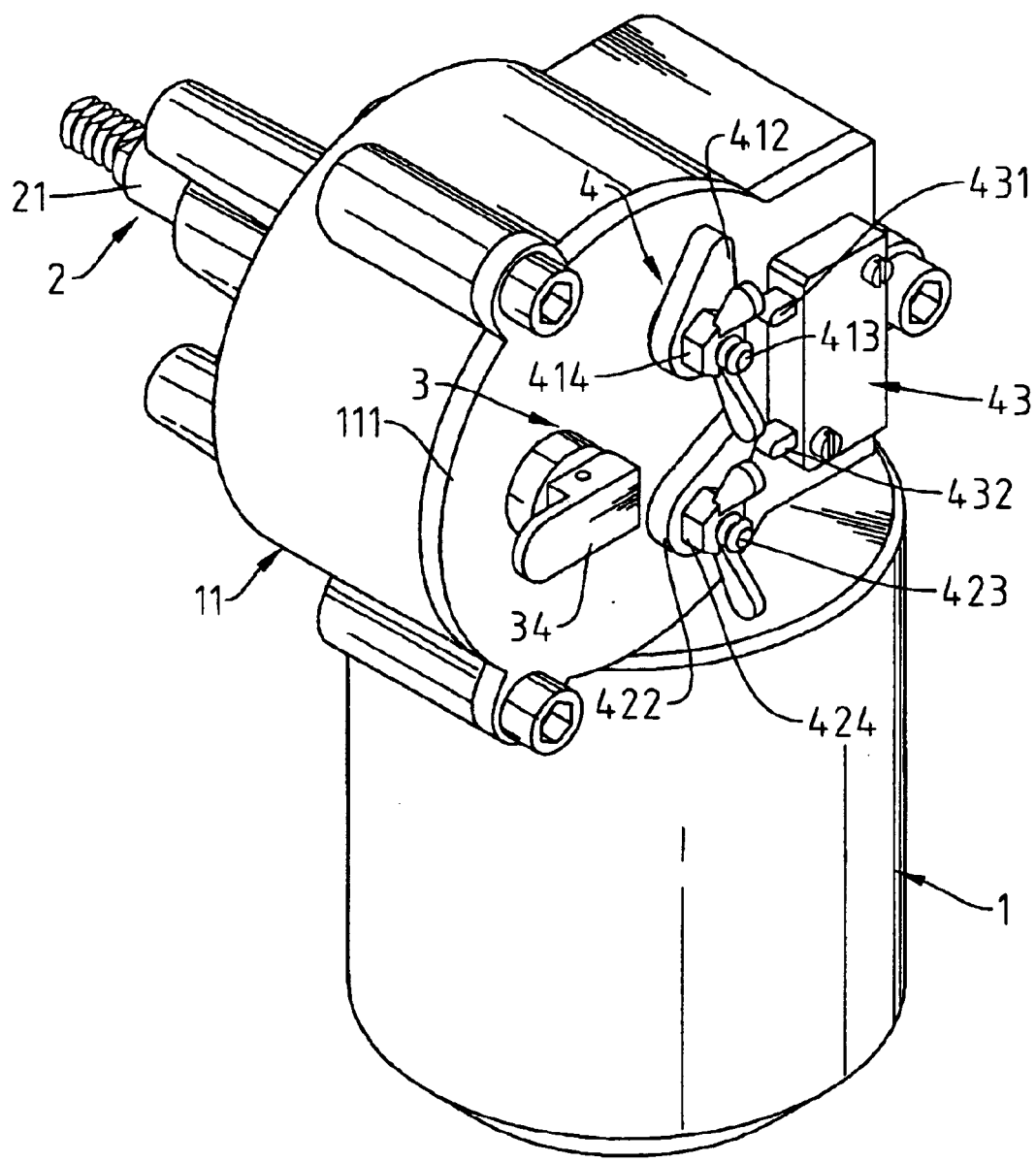
FIG. 2 is an elevation al view of a motor drive according to the present invention.
Figure 3:
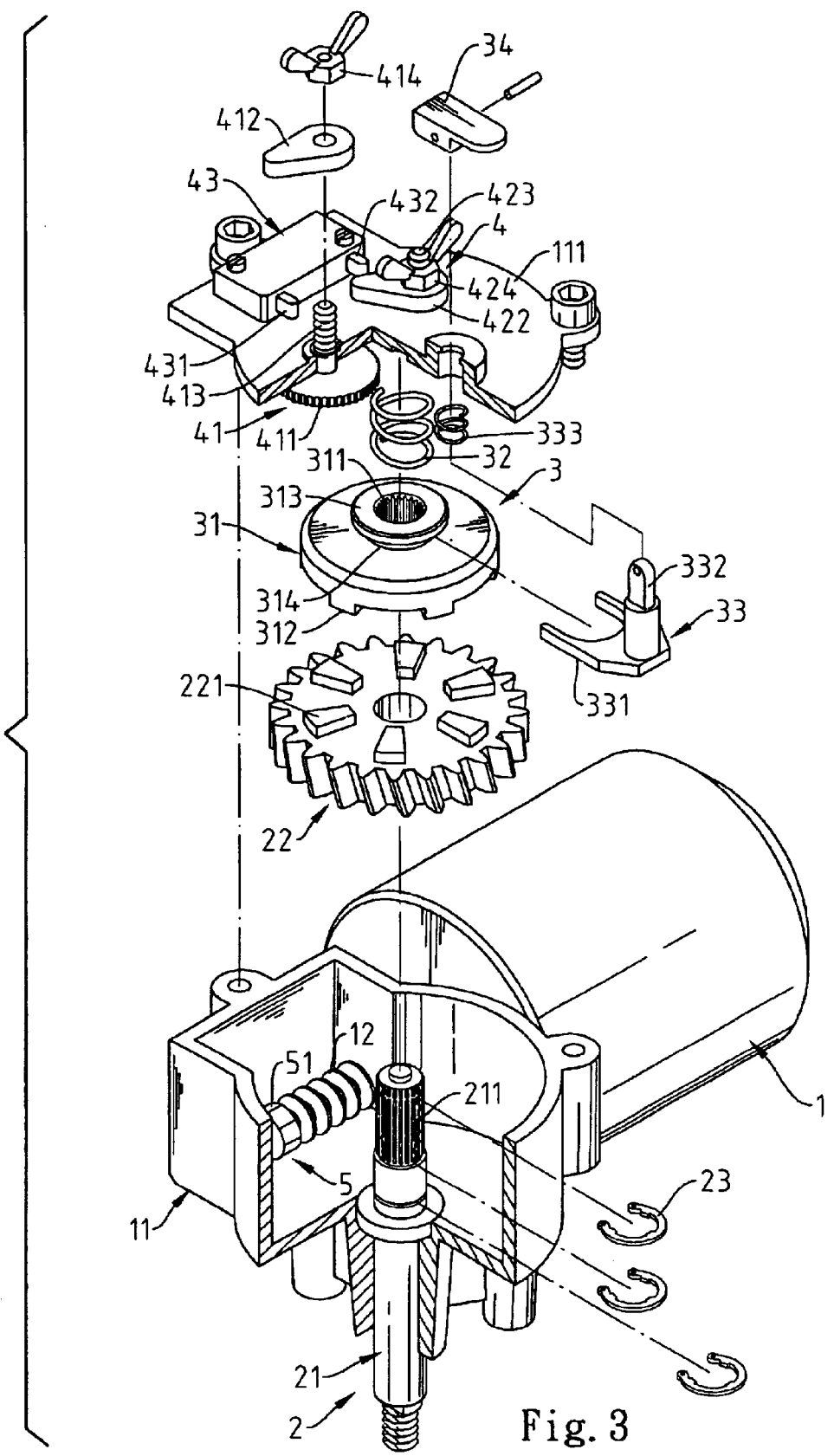
FIG. 3 is an exploded view of the motor drive according to the present invention.
Figure 4:
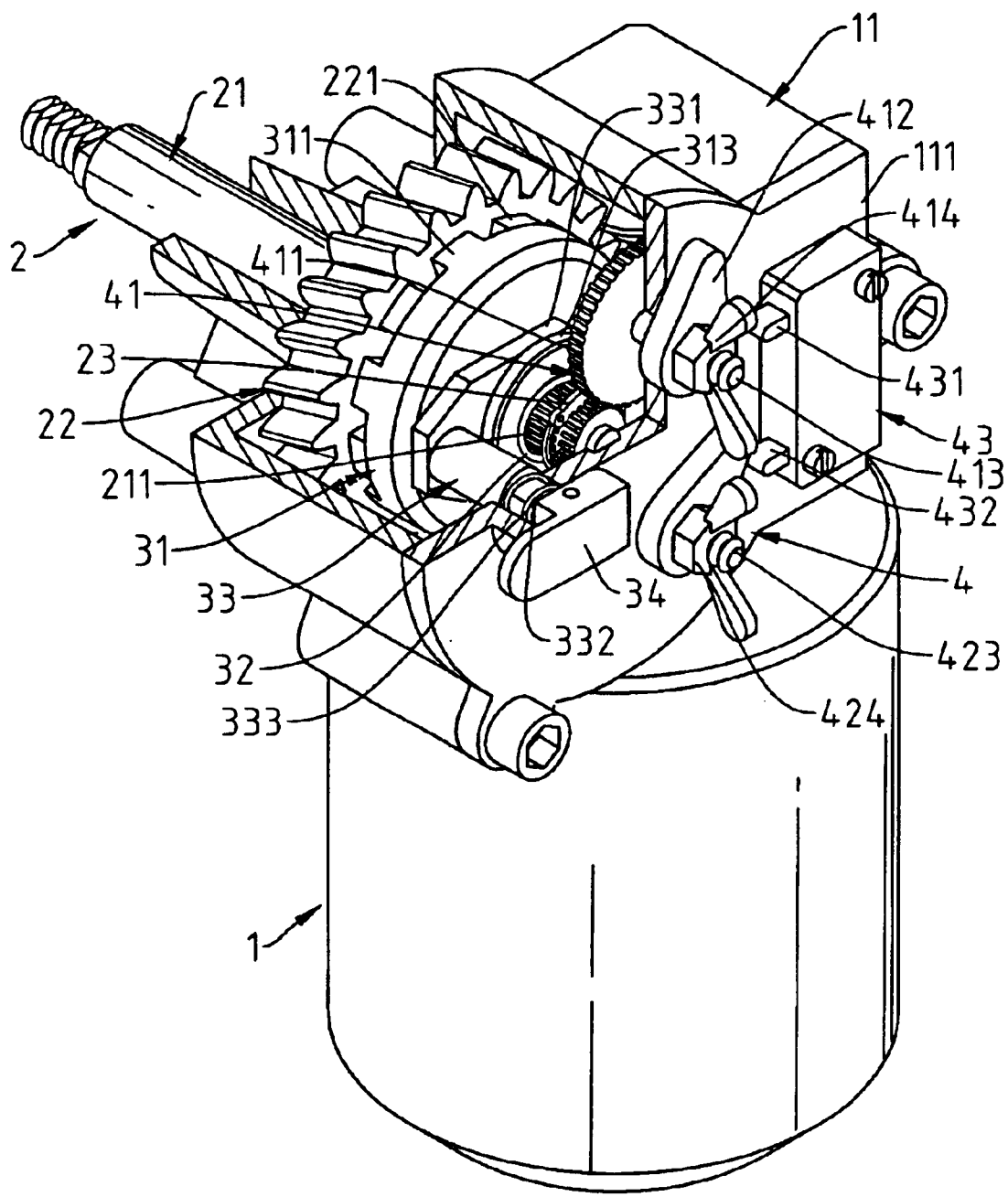
FIG. 4 is a sectional elevation of the present invention, showing the internal arrangement of the motor drive inside the casing.

Referring to FIGS. 2~7, a motor drive is shown comprised of a DC motor 1, a speed reducing mechanism 2, a clutch 3, a mechanical step counter 4, and an electronic step counter 5.

The DC motor 1 has the output shaft thereof fixedly mounted with a worm 12, which is fastened pivotally with the inside of a casing 11, which is fixedly fastened to the front side of the DC motor 1.

The speed reducing mechanism 2 comprises a main shaft 21 fastened pivotally with the inside of the casing 11, and a worm gear 22 mounted on the main shaft 21 for free rotation relative to the main shaft 21 and meshed with the worm 12. The worm gear 22 has a plurality of radial engagement blocks 221 equiangularly located on one side.

The clutch 3 is mounted inside the casing 11, comprised of a clutch gear 31, a spring member 32, a lever 33, and a locking plate 34, The clutch gear 31 has a toothed center hole 311 axially movably mounted on the toothed front section 211 of the main shaft 21 of the speed reducing mechanism 2, a plurality of radial engagement blocks 312 equiangularly located on one side, an annular flange 313 protruded from the other side around the toothed center hole 311, and a locating groove 314 extended around the periphery of the annular flange 313. The clutch 3 can be moved axially along the toothed front section 211 of the main shaft 21 relative to the worm gear 22 between a first position where the radial engagement blocks 312 of the clutch gear 31 are respectively forced into engagement with the radial engagement blocks 221 of the worm gear 22 for enabling the clutch gear 31 to be synchronously rotated with the worm gear 22, and a second position where the radial engagement blocks 312 of the clutch gear 31 are moved away from the radial engagement blocks 221 of the worm gear 22 for enabling the clutch gear 31 to run idle. The spring member 32 is stopped between the annular flange 313 of the clutch gear 31 and a clamp 23 at the toothed front section 211 of the main shaft 21 of the speed reducing mechanism 2 to force the radial engagement blocks 312 of the clutch gear 31 into engagement with the radial engagement blocks 221 of the worm gear 22 (see FIG. 5), for enabling the worm gear 22 to rotate the clutch gear 31 and then to further rotate the main shaft 21 when the DC motor 1 started to rotate the worm 12. The lever 33 comprises a substantially U-shaped front retaining plate 331 engage able into the locating groove 314 of the clutch gear 31, a rod-like lever body 332 extended out of one side wall 111 of the casing 11 and connected to the locking plate 34, and a spring 333 mounted on the rod-like lever body 332 and stopped between a part of the rod-like lever body 332 and the side wall 111 of the casing 11 to impart a forward pressure to the lever 33 (see FIG. 6). When the locking plate 34 turned outwards, it forces the lever 33 toward the sidewall 111 of the casing 11, thereby causing the radial engagement blocks 312 of the clutch gear 31 to be disengaged from the radial engagement blocks 221 of the worm gear 22. At this time, the worm gear 22 runs idle.

The mechanical step counter 4 is comprised of a first reducing gear set 41, a second reducing gear set 42, and a limit switch 43. The first reducing gear set 41 and the second reducing gear set 42 are respectively coupled to the toothed front section 211 of the main shaft 21 for synchronous rotate (see FIG. 7). The last reducing gear 411 or 421 of the reducing gear set 41 or 42 has a threaded gear shaft 413 or 423 extended out of the sidewall 111 of the casing 1t. A protruding block 412 or 422 is mounted on the threaded gear shaft 413 or 423. A wing nut 414 or 424 is threaded onto the threaded gear shaft 413 or 423 to fix the protruding block 412 or 422. The limit switch 43 has two contacts 431 and 432. The protruding blocks 414 and 424 are adapted to touch contacts 431 and 432 of the limit switch 43, and to further control forward/backward rotation of the DC motor 1. When loosening the wing nut 414 or 424, the user can adjust the angular position of the respective protruding block 412 or 422, achieving a mechanical step control.

Figure 5:
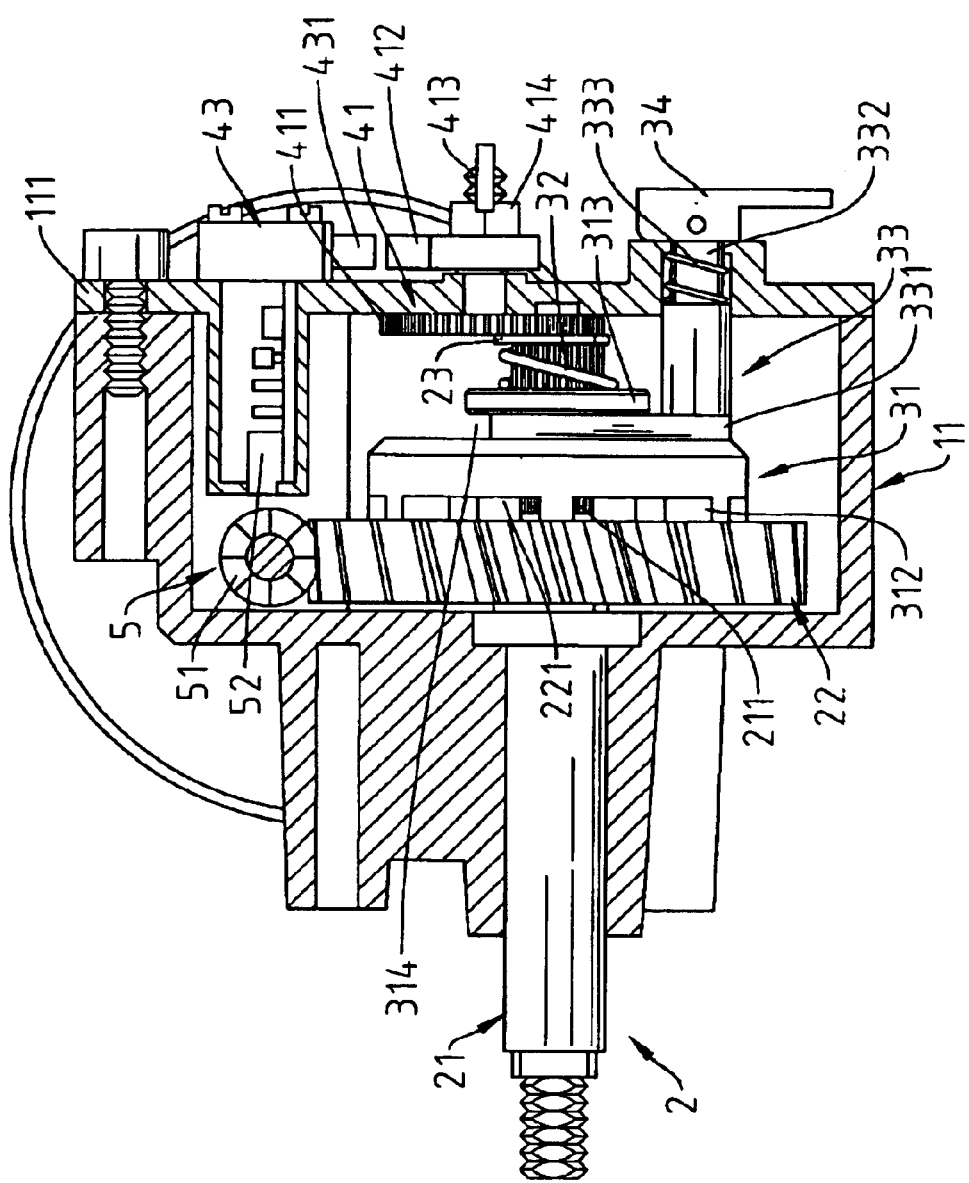
FIG. 5 is another sectional elevation of the present invention, showing the internal arrangement of the motor drive inside the casing.
Figure 6:
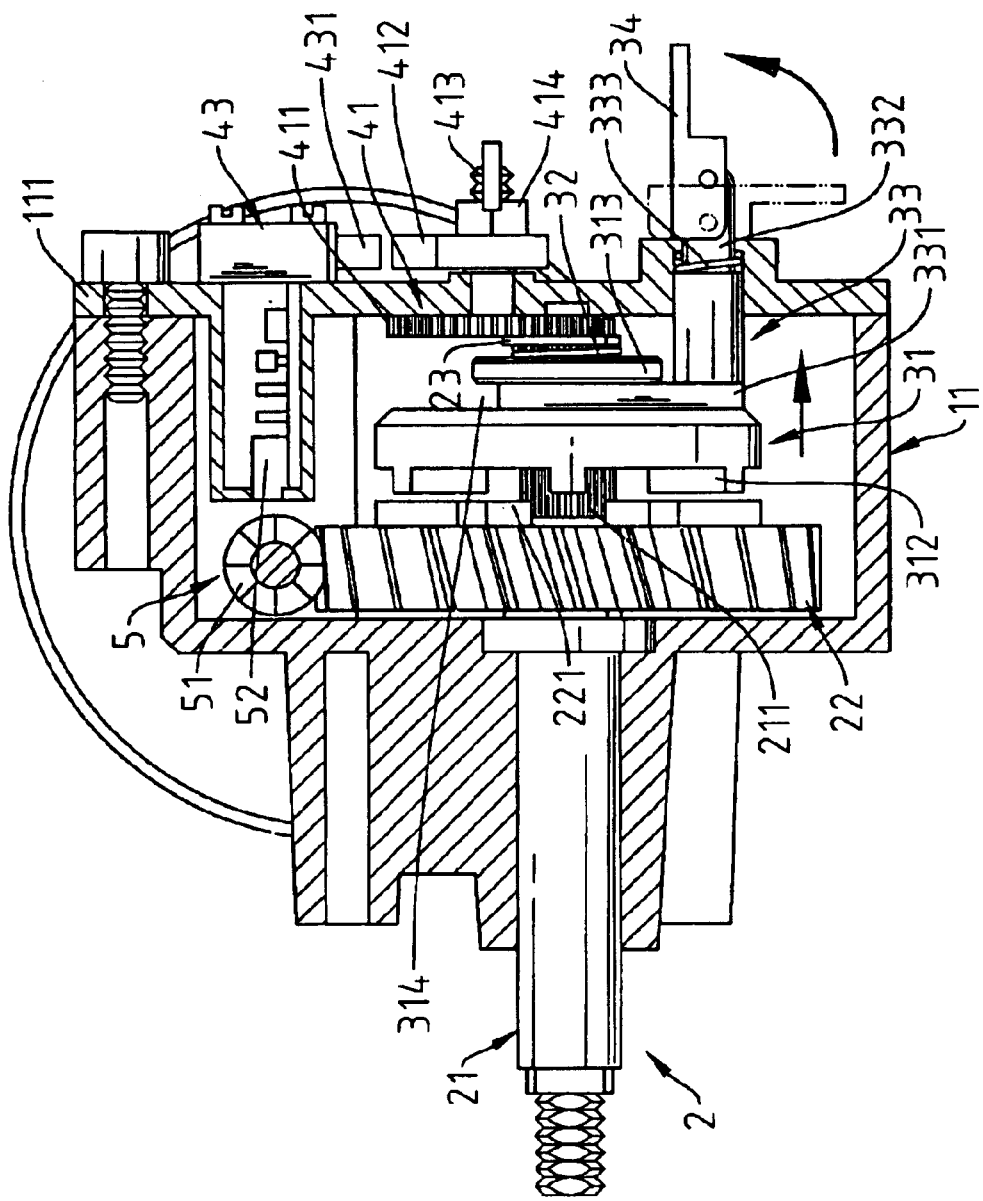
FIG. 6 is a side sectional view of the motor drive according to the present invention.
Figure 7:
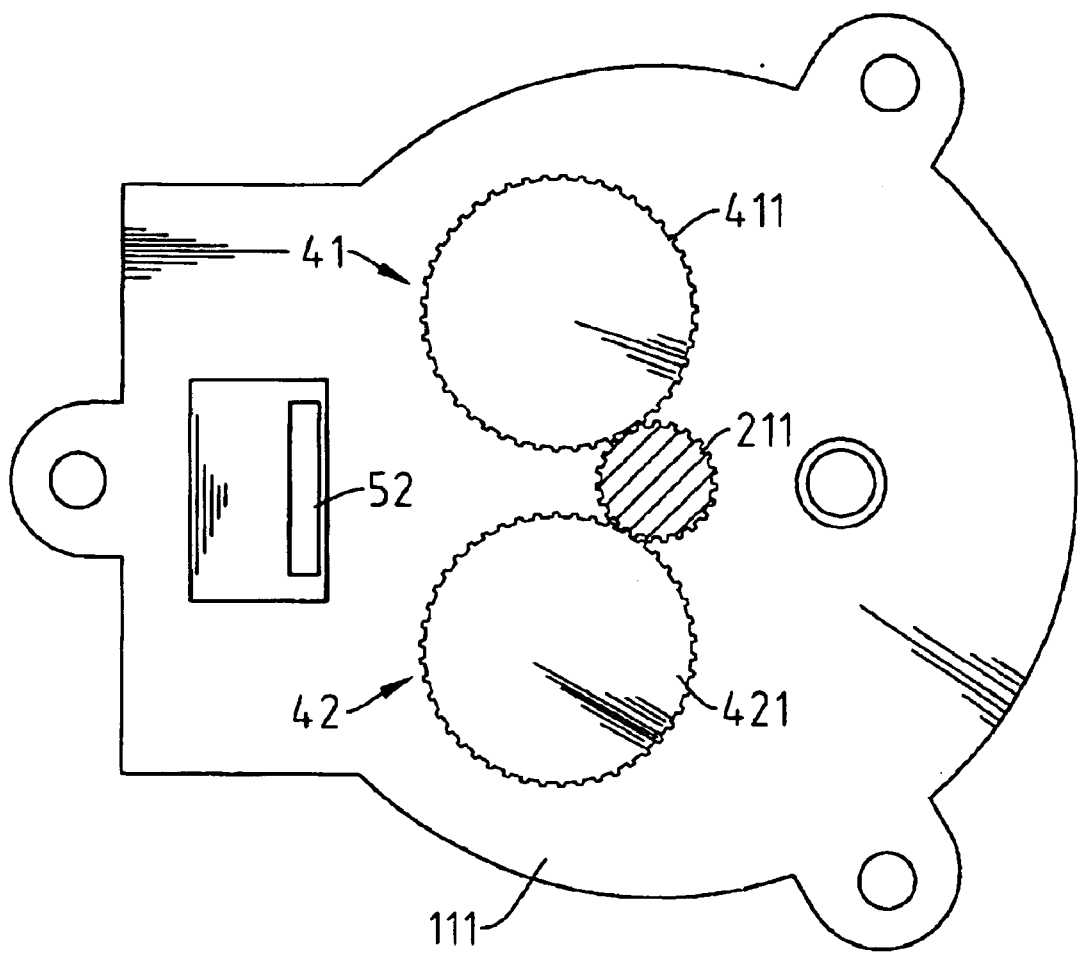
FIG. 7 is a top plain view of the present invention showing the arrangement of the reducing gear sets of the mechanical step counter.

The electronic step counter 5 comprises a multi-magnet member 51 mounted on the top end of the worm 11 for synchronous rotation, and an inductor 52 fixedly mounted in the casing 11 and facing the multi-magnet member 51 (see FIG. 5). The electronic step counter 5 detects the pulse of the DC motor 1, and outputs a signal to a control IC (not shown) subject to the pulse of the DC motor 1, enabling the control IC to calculate the time of controlling forward/backward rotation of the DC motor 1.

The aforesaid motor drive is practical for use to control an electric steel rolling door or the side door of a car. The combination of the DC motor, the clutch, the speed reducing mechanism, the mechanical step counter, and the electronic step counter shows a compact structure that is easy and inexpensive to manufacture.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A motor drive comprising:

a DC motor, said DC motor having a casing at one side and a worm fixedly mounted on an output shaft thereof and fastened pivotally with said casing;

a speed reducing mechanism, said speed reducing mechanism comprising a main shaft fastened pivotally with said casing, and a worm gear mounted on said main shaft for free rotation relative to said main shaft and meshed with said worn, said worm gear having a plurality of radial engagement blocks equiangularly located on one side thereof;

a clutch mounted inside said casing, said clutch comprising a clutch gear, said clutch gear axially movably mounted on said main shaft of said speed reducing mechanism, an annular flange protruded from an opposite side thereof, and a locating groove extended around the periphery of said annular flange, said clutch gear being axially movable along said main shaft relative to said worm gear between a first position where said clutch gear is forced into engagement with the radial engagement blocks of said worm gear for enabling synchronously rotation with said worm gear, and a second position where said clutch gear is disengaged from the radial engagement blocks of said worm gear for enabling idle running, a spring member adapted to force said clutch gear into engagement with said worm gear, a lever coupled to the locating groove of said clutch gear, and a locking plate coupled to said lever for operation by the user to drive said lever to move said clutch gear away from said worm gear for enabling said main shaft to run idle;

a mechanical step counter adapted to control forward/backward rotation of said DC motor, said mechanical step counter comprising a limit switch, a first reducing gear set coupled to said main shaft for synchronous rotation and adapted to drive said limit switch to control forward rotation of said DC motor, and a second reducing gear set coupled to said main shaft for synchronous rotation and adapted to drive said limit switch to control backward rotation of said DC motor, said first reducing gear set and said second reducing gear set each having a last reducing gear, said last reducing gear having a gear shaft extending out of one sidewall of said casing, and a protruding block mounted on said gear shaft of said last reducing gear and adapted to trigger a respective contact of said limit switch; and an electronic step counter, said electronic step counter comprising a control IC, a multi-magnet member mounted on one end of said worm for synchronous rotation, and an inductor fixedly mounted in said casing and facing said multi-magnet member and adapted to detect the pulse of said DC motor and output a signal to said control IC subject to the pulse of said DC motor, enabling said control IC to calculate the time to control forward/backward rotation of said DC motor.

2. The motor drive as claimed in claim 1, wherein said main shaft has a toothed front section, and said clutch gear has a toothed center hole axially slidably meshed with the toothed front section of said main shaft.

3. The motor drive as claimed in claim 1, wherein said clutch gear has a plurality of radial engagement blocks arranged on one side thereof and adapted to engage the radial engagement blocks of said worm gear.

4. The motor drive as claimed in claim 1, said spring member of said clutch is stopped between the annular flange of said clutch gear and a clamp at said main shaft of said speed reducing mechanism to force said clutch gear into engagement with the radial engagement blocks of said worm gear.

5. The motor drive as claimed in claim 1, wherein said lever has a U-shaped front retaining plate engage able into the locating groove of said clutch gear.

6. The motor drive as claimed in claim 1, wherein said lever has a rod-like lever body extended from said U-shaped front retaining plate to the outside of said casing and connected to said locking plate, and a spring mounted on said rod-like lever body and stopped between a part of said rod-like lever body and said casing to force said U-shaped front retaining plate into engagement with the locating groove of said worm gear.

7. The motor drive as claimed in claim 1, wherein the gear shafts of the last gears of said first reducing gear set and said second reducing gear set each have a threaded portion; said mechanical step counter further comprises two wing nuts respectively threaded on the threaded portions of the gear shafts of the last gears of said first reducing gear set and said second reducing gear set to fix the respective protruding blocks on the gear shafts of the respective last gears in position.

8. The motor drive as claimed in claim 7, wherein the contact stroke between the contacts of said limit switch and the protruding blocks of said first reducing gear set and said second reducing gear set is adjustable by loosening said wing nuts and adjusting angular position of said protruding blocks on the gear shafts of the last reducing gears of said first reducing gear set and said second reducing gear set respectively.

* * * * *